United States Patent
Selig

(10) Patent No.: US 8,245,151 B2
(45) Date of Patent: Aug. 14, 2012

(54) WEB BROWSER WINDOW MANAGEMENT

(75) Inventor: Roy A. Selig, Hillsborough, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 925 days.

(21) Appl. No.: 11/978,907

(22) Filed: Oct. 30, 2007

(65) Prior Publication Data

US 2008/0184158 A1 Jul. 31, 2008

Related U.S. Application Data

(60) Provisional application No. 60/898,294, filed on Jan. 30, 2007.

(51) Int. Cl.
*G06F 3/048* (2006.01)
(52) U.S. Cl. .......................... 715/781; 715/783
(58) Field of Classification Search .................. 715/783, 715/781
See application file for complete search history.

(56) References Cited

U.S. PATENT DOCUMENTS

| | | | |
|---|---|---|---|
| 5,371,847 A | 12/1994 | Hargrove | |
| 5,838,318 A * | 11/1998 | Porter et al. | 715/790 |
| 5,920,313 A * | 7/1999 | Diedrichsen et al. | 715/767 |
| 5,995,103 A * | 11/1999 | Ashe | 715/804 |
| 6,237,030 B1 | 5/2001 | Adams et al. | |
| 6,272,493 B1 | 8/2001 | Pasquali | |
| 6,321,209 B1 | 11/2001 | Pasquali | |
| 6,405,222 B1 * | 6/2002 | Kunzinger et al. | 715/205 |
| 6,434,563 B1 | 8/2002 | Pasquali et al. | |
| 6,535,882 B2 | 3/2003 | Pasquali | |
| 6,636,856 B2 | 10/2003 | Pasquali | |
| 6,658,419 B2 | 12/2003 | Pasquali | |
| 6,918,066 B2 | 7/2005 | Dutta et al. | |
| 6,961,765 B2 * | 11/2005 | Terry | 709/224 |
| 7,085,736 B2 | 8/2006 | Keezer et al. | |
| 7,089,237 B2 | 8/2006 | Turnbull et al. | |
| 7,107,264 B2 | 9/2006 | Lu | |
| 7,484,181 B2 | 1/2009 | Duperrouzel et al. | |
| 7,673,045 B1 * | 3/2010 | Battle et al. | 709/225 |
| 2003/0146939 A1 | 8/2003 | Petropoulos et al. | |
| 2004/0066414 A1 * | 4/2004 | Czerwinski et al. | 345/781 |
| 2004/0165007 A1 | 8/2004 | Shafron | |
| 2004/0205633 A1 | 10/2004 | Martinez et al. | |
| 2005/0039144 A1 | 2/2005 | Wada et al. | |
| 2006/0059434 A1 | 3/2006 | Boss et al. | |
| 2006/0069617 A1 | 3/2006 | Milener et al. | |
| 2006/0101341 A1 | 5/2006 | Kelly et al. | |
| 2006/0143568 A1 | 6/2006 | Milener et al. | |

(Continued)

OTHER PUBLICATIONS

Wikipedia; Dashboard (software); www.en.wikipedia.com; Apr. 29, 2005; pp. 1-7.

(Continued)

*Primary Examiner* — Tuyetlien Tran
*Assistant Examiner* — Peiyong Weng
(74) *Attorney, Agent, or Firm* — Kraguljac Law Group, LLC

(57) ABSTRACT

Systems, methodologies, media, and other embodiments associated with web browsers are described. One exemplary embodiment includes a graphical user interface having a window arrangement option for display on a display screen and being configured to initiate, when selected, an arrangement of open windows having a selected window type. An arrangement logic that, in response to the window arrangement option being selected, re-displays the open windows having the selected window type in a selected arrangement on the display screen without re-displaying open windows not having the selected window type.

17 Claims, 12 Drawing Sheets

U.S. PATENT DOCUMENTS

| | | | |
|---|---|---|---|
| 2006/0179404 A1 | 8/2006 | Yolleck et al. | |
| 2006/0184578 A1 | 8/2006 | La Rotonda et al. | |
| 2006/0184997 A1 | 8/2006 | La Rotonda et al. | |
| 2006/0224951 A1 | 10/2006 | Burke et al. | |
| 2006/0230356 A1 | 10/2006 | Sauve et al. | |
| 2006/0294476 A1 | 12/2006 | Buckley | |
| 2007/0101298 A1 | 5/2007 | Yolleck et al. | |
| 2008/0115081 A1* | 5/2008 | Sankaravadivelu et al. | 715/783 |
| 2008/0120570 A1* | 5/2008 | Adams et al. | 715/804 |

OTHER PUBLICATIONS

Wikipedia; Windows Sidebar; www.en.wikipedia.org; Nov. 8, 2006; pp. 1-3.

King, Brian; What is Firefox, Published on O'Reilly Network; http://www.oreillynet.com; Sep. 26, 2005; pp. 1-7.

Xulplanet; XUL Tutorial, Ch. 4.5: Content Panels (pp. 1-3) www.xulplanet.com/tutorials/xultu; Feb. 19, 2006.

Microsoft Corp.; Browse, Shop & Search Multiple Websites at Once; http://www.microsoft.com/windows/ie/ie7/tour/fre/tabs/how.html; Apr. 2007; p. 1.

Microsoft Corp.; Windows Help and How-To; Windows Vista Help: Using Quick Tabs in Internet Explorer; http://windowshelp.microsoft.com/04/2007; p. 1-2.

US Patent and Trademark Office Non-Final Office Action in co-pending U.S. Appl. No. 11/978,772, filed Oct. 30, 2007, having a Notification Date of Sep. 22, 2010.

US Patent and Trademark Office Final Office Action in co-pending U.S. Appl. No. 11/978,772, filed Oct. 30, 2007, having a Notification Date of Jan. 12, 2011.

US Patent and Trademark Office Action in co-pending U.S. Appl. No. 11/978,722, filed Oct. 30, 2007, having a Notification Date of Sep. 23, 2011.

Guy Hart-Davis, Mastering Windows XP Home Edition (hereinafter XP) ISBN: 0-7821-4384-9 published 2005, pp. 1-3.

US Patent and Trademark Office Non-Final Office Action in co-pending U.S. Appl. No. 11/978,772, filed Oct. 30, 2007, having a Notification Date of Apr. 20, 2011.

* cited by examiner

WEB BROWSER WINDOW MANAGEMENT

CROSS REFERENCE TO RELATED APPLICATIONS

This application claims the benefit of U.S. Provisional Application Ser. No. 60/898,294 filed Jan. 30, 2007, which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Computer users often work with multiple web browsers open at once and typically can have many other types of windows open while working with a variety of software applications. With many open windows on a display screen, the screen can become cluttered and be burdensome for the user to organize or find content easily.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
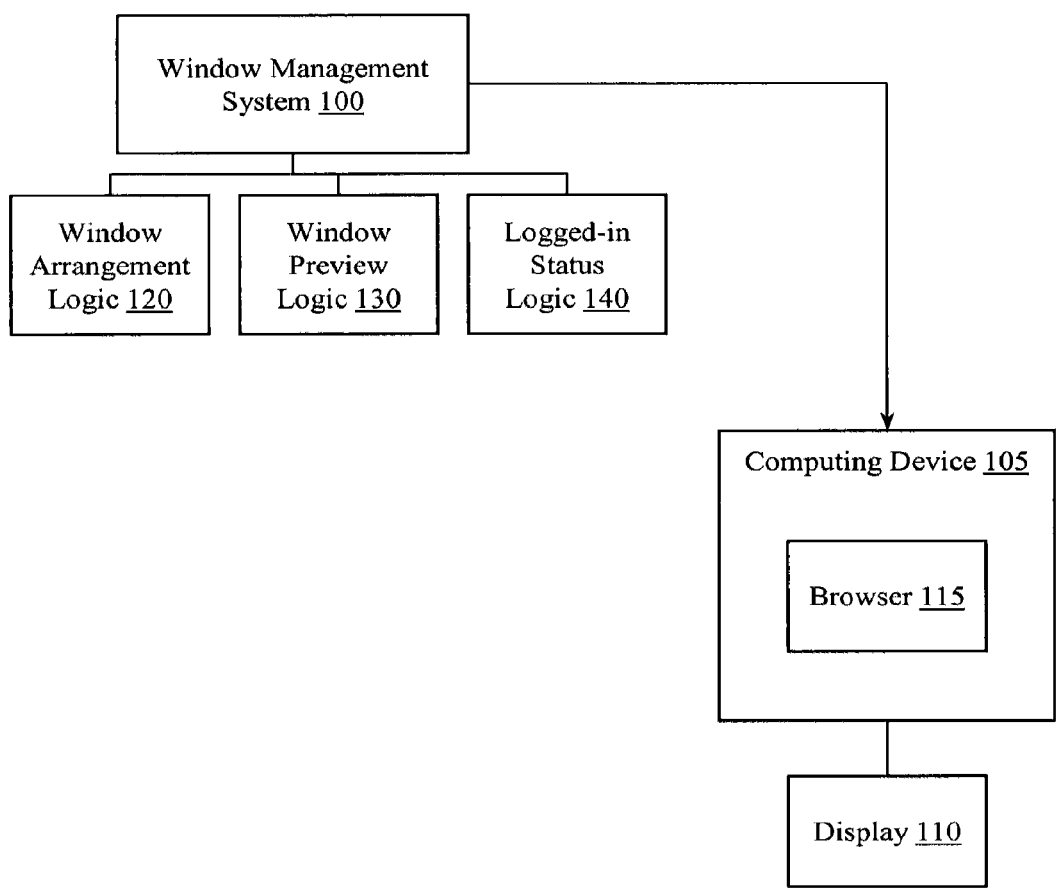
FIG. 1 illustrates an example block diagram of one embodiment of a window management system.

In one embodiment, a window management system is provided to manage windows, for example browser windows, that are open on a computer desktop or display screen. The system is embodied as software and can be implemented as a feature in a web browser or can be delivered to a client device as a part of a web browser extension that is installed into the web browser. In one embodiment, an enterprise-ready web browser can be created via a productivity pack delivered as a browser extension. Using web browser extension management mechanisms, the browser extension described herein adds features and tools to a base web browser.

In one embodiment, the window management system provides an arrangement mechanism that can organize and arrange windows based on window type or other window attribute. For example, when multiple browser windows are open among a group of open windows, the present system can identify the browser windows and re-display the browser windows in a new arrangement such as bringing them into view above non-browser windows.

In another embodiment, a window preview feature is described herein that provides users with enhanced insight into the state of and/or the content within browser windows that may not be within the user's view.

In another embodiment, a Logged-In Status feature is provided that can determine and manage a list of domains that a user is logged into.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a non-transitory medium that embodies or stores signals, instructions and/or data. A computer-readable medium may take forms, including, but not limited to, non-volatile media and volatile media. Non-volatile media may include, for example, optical or magnetic disks and so on. Volatile media may include, for example, semiconductor memories, dynamic memory and the like. Common forms of a computer readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, digital signals, and other media from which a computer, a processor or other electronic device can read.

"logic", as used herein, includes but is not limited to hardware, firmware, software on a non-transitory computer-readable medium and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software embodied in a tangible media. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Javascript, markup languages, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software components, computers or other devices, or combinations of these.

"Z-order" is an ordering of overlapping two-dimensional objects, such as windows in a graphical user interface (GUI) or shapes in a vector graphics editor. One of the features of a typical GUI is that windows may overlap, so that one window hides part or all of another window. When two windows overlap, their z-order determines which one appears on top of the other. In one implementation, objects with a higher z-order will be drawn and displayed on top of (and therefore obscure) objects with a lower z-order.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical transformations of physical quantities (e.g. change data values, change states of a component, etc). Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, transmitting, retrieving, communicating, calculating, determining, displaying, or the like, refer to actions and processes of a computer system, logic, processor, or similar electronic device that manipulates and transforms data represented as physical (electronic) quantities.

With reference to FIG. 1, an example block diagram of a window management system 100 is illustrated that provides features for a computing device 105 to manage windows on a computer desktop of a display screen 110. In one embodiment, the window management system 100 is embodied as software and can be implemented as a feature in a web browser 115. In another form, the system 100 can be delivered by a web-based application to the computing device 105 as a part of a web browser extension that is installed into the web browser 115. In the various embodiments described herein, the window management system 100 can include a number of components like a window arrangement logic 120, a window preview logic 130, and/or a logged-in status logic 140.

As a brief explanation, the window arrangement logic 120, in one embodiment, is configured to organize windows based on window type or other window attribute. For example, when multiple browser windows are open among a group of open windows, the system can identify browser windows and re-display the browser windows in a new arrangement. Regarding the window preview logic 130, in one embodiment, the logic 130 is configured to provide the state of and/or the content within browser windows that may not be within a user's view. Regarding the logged-in status logic 140, in one embodiment, the logic 140 is configured to determine and manage a list of domains that a user is currently logged into. These components are described in more detail as follows.

Figure 2:
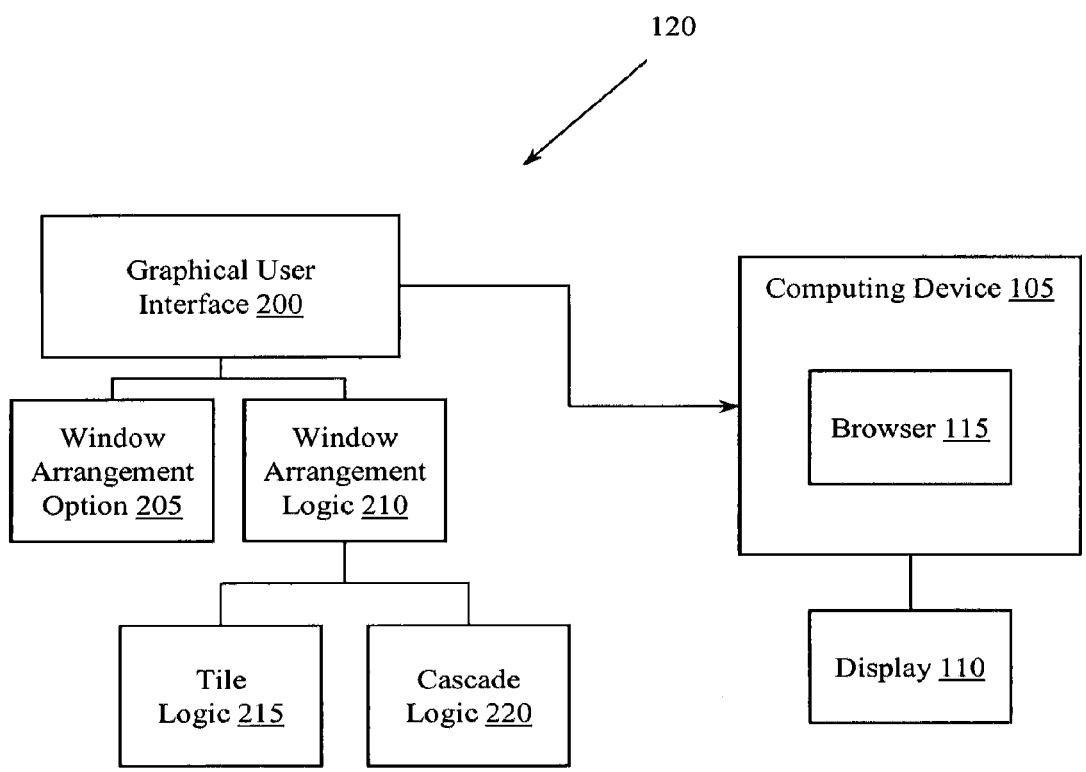
FIG. 2 illustrates one embodiment of a window arrangement logic.

With reference to FIG. 2, one embodiment of the window arrangement logic 120 includes a graphical user interface 200. The graphical user interface 200 can be embodied as part of the web browser application 115 or as a browser extension configured to be installed as part of the web browser application 115. In another implementation, the graphical user interface 200 can be part of a desktop application or other desired application programmed to provide the window arrangement features described herein and their equivalents. Accordingly, the graphical user interface 200 can be embodied as processor executable instructions embodied on a computer-readable medium.

In one embodiment, the graphical user interface 200 includes a window arrangement option 205 and a window arrangement logic 210. The arrangement option 205 provides a selectable object for display on the display screen 110. For example, the arrangement option 205 can be configured as a menu item, an icon, or other selectable object displayed on the display screen. When selected, the arrangement option 205 is configured to initiate an arrangement of open windows having a selected window type. The selected window type can be a default type such as browser windows, and/or the arrangement option 205 can allow a user to select a window type from a list of types (e.g. browser windows, application windows, windows with an error condition, or other types like icons, tabs, etc).

In response to the window arrangement option 205 being selected, the arrangement logic 210 re-displays the open windows having the selected window type (e.g. browser windows) in a selected arrangement on the display screen without re-displaying open windows not having the selected window type. Thus if "browser window" is the type being arranged, open browser windows would be identified from all open windows and then be re-displayed in the selected new arrangement. Non-browser windows (e.g. windows from other applications) would not be included in the re-display. If desired, browser alerts and/or browser source windows can also be excluded from the arrangement. In one example, the arrangement logic 210 is configured to re-display the open windows having the selected window type (e.g. browser windows) on top of other windows. As such, the browser windows would be re-displayed in view (fully or partially) over non-browser windows in a tile or cascade arrangement, which will be described in further detail below.

To identify the window type, the arrangement logic 210 can include logic to determine a window type of open windows. This can be performed by obtaining properties or attributes from each open window to determine its type. In one embodiment based on a Firefox® browser, the window type can be determined by getting a hook from a component called Windows Mediator, which is a mechanism for disclosing code associated with all open browser windows. A datasource for this is rdf:window-mediator and a list of currently open windows can be obtained. By getting a hook, the arrangement logic 210 obtains a pointer to the window so that the window can be manipulated. The list of open windows can be enumerated to determine a collection of windows that are of the window-type of interest (e.g. the browser windows). The identified browser windows can then be manipulated as part of the selected arrangement action. It will be appreciated that an open window can include a window that has been minimized.

The selected arrangement can include a tile and/or cascade arrangement. Accordingly, the graphical user interface 200 includes a tiling logic 215 and a cascade logic 220. For example, the tiling logic 215 is configured to, based on an available display area, adjust a size and position of each open window having the selected window type to fit within the available display area in a tile arrangement (see FIG. 3). The cascading logic 220 is configured to, based on the available display area, adjust a size and position of each open window having the selected window type to fit within the available display area in a cascade arrangement (see FIG. 4).

Figure 3:
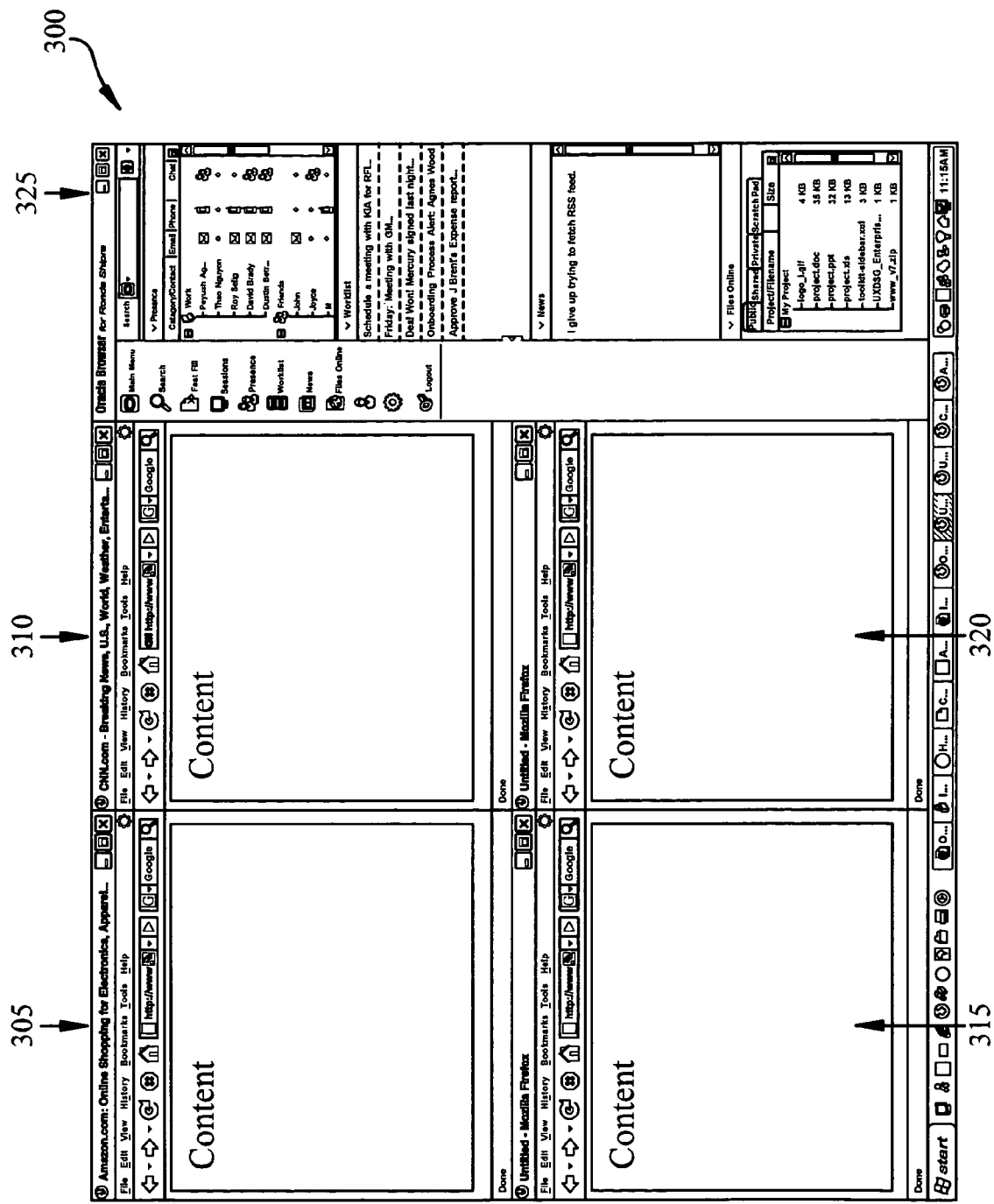
FIG. 3 illustrates an example display screen with tiled browser windows.

With reference to FIG. 3, one example of a display screen 300 is shown where a number of browser windows have been arranged and re-displayed in a tile format. The browser windows are labeled as 305, 310, 315, and 320. An example sidebar 325 is also shown. Non-browser windows are ignored and excluded from the arrangement and, if any are open, they are covered by the tiled browser windows. Thus, the available display area includes space occupied by non-browser windows. Using the tile option, a user can easily and automatically re-organize all open browser windows, which may be initially hidden from view by other windows and be difficult to locate.

In one embodiment, the tile logic 215 can include a positioning algorithm that is executed to determine an optimal size/shape and display positions for the windows. Based on the number of browser windows and the available screen space, the browser windows can be adjusted and re-displayed in a tile arrangement based on their new size and position. Ordering options can also be applied like starting the display from the most recently accessed window to the last. The browser windows can be arranged in a left to right, top to bottom fashion. As previously stated, the browser windows would be arranged on top of the non-browser windows. This can be performed by changing the z-order of the windows.

Figure 4:
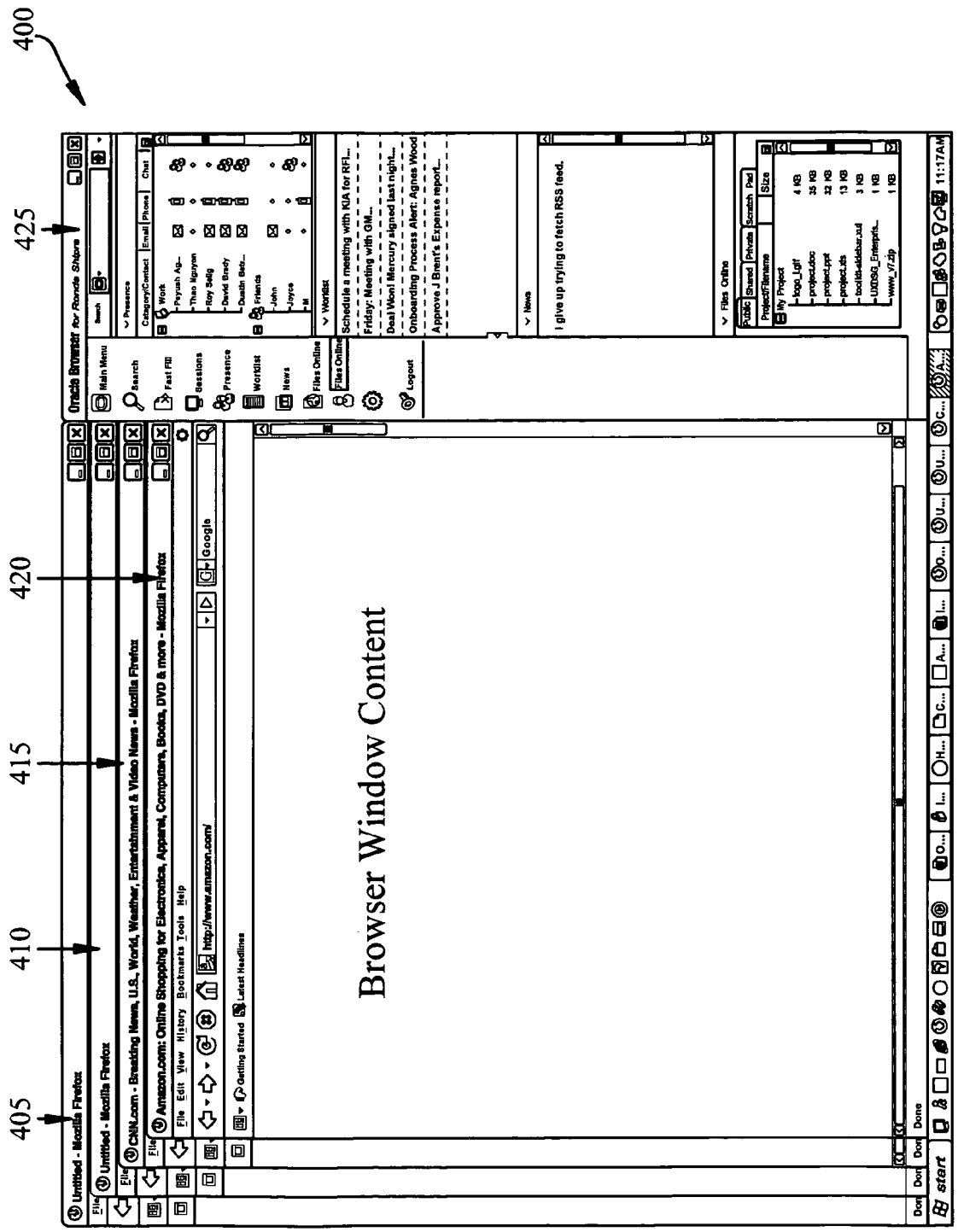
FIG. 4 illustrates an example display screen with cascaded browser windows.

With reference to FIG. 4, one example of a display screen 400 is shown where a number of browser windows have been arranged and re-displayed in a cascade arrangement. The browser windows are labeled as 405, 410, 415, and 420. An example sidebar 425 is also shown. For a cascade arrangement based on the identified open browser windows, the cascade logic 220 determines an available display area and sizes and positions the windows accordingly. A cascade order can also be determined based on the most recently accessed window, and then browser windows are re-displayed in reverse order. Thus, the most recently accessed window is displayed last and is on top. Of course, other types of ordering can be used.

As one example of cascading, the cascade logic 220 can be configured to determine a starting (x, y) screen coordinate and an (x, y) offset (e.g. a 20 pixel offset from the previous window origin point). At the starting screen coordinate, the first browser window is positioned (e.g. window 405 in FIG. 4), then the (x, y) offset is applied (e.g. 20 pixels by 20 pixels) and the second browser window is positioned (e.g. window 410). This continues until all of the browser windows are displayed.

In another example, the window arrangement logic 210 can take into account whether a sidebar is present (e.g. sidebar 325 in FIG. 3 or sidebar 425 in FIG. 4). For example as part of the tile or cascade operation, the logic can verify if a sidebar is present on the display. The sidebar 325 or 425 can be a floating sidebar (e.g. displayed in a separate browser window). If present, the floating sidebar can be positioned differently (e.g. to the right side of the display screen). Then the positioning algorithm can determine appropriate sizes/shapes of the remaining browser windows in the remaining display space without affecting the space of the sidebar. When a sidebar 325/425 is present, the available display space can be modified to exclude the area occupied by the sidebar. The premise being that the sidebar 325/425 is desirable and should not be covered by the other windows during window arrangement.

The sidebar 325 or 425 is a type of content interface that is primarily implemented to enable a set of functionally important tasks to be made available to a user on a persistent basis. A sidebar can include multiple content panes/windows that display customized content from web-based applications like an enterprise application. The content is separate from web page content, and is received by communicating with the web-based applications. Sidebars also permit task-oriented functionality via sidebar supports, as opposed to a subset or frequently-used set, as in a toolbar implementation. A fundamental difference between sidebar-type interfaces from toolbar-type interfaces is primarily one of context. A toolbar is primarily implemented to function as a swift, iconic access to frequently used commands in an application interface.

Example Methods

Figure 5:
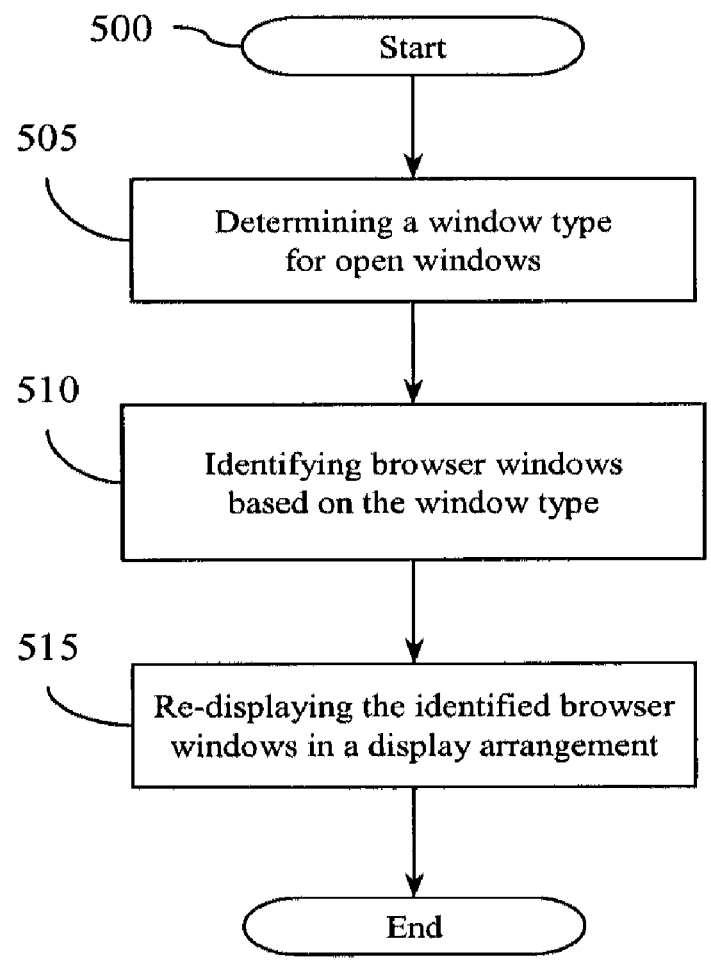
FIG. 5 illustrates an example method associated with arranging windows based on type.

Example methods may be better appreciated with reference to flow diagrams. For example, FIG. 5 illustrates one embodiment of a method 500 that relates to arranging open windows based on window type. In this example, browser windows are arranged, although other types can be used. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

It will be appreciated that the illustrated elements denote "processing blocks" that may be implemented in logic. In one example, the processing blocks may represent executable instructions that cause a computer, processor, and/or logic device to respond, to perform an action(s), to change states, to make decisions, and/or otherwise perform the method. Thus, the described methodologies can be implemented as processor executable instructions and/or operations provided by a computer-readable medium. In another example, the processing blocks may represent functions and/or actions performed by a computing device when executing the instructions. The diagram, as well as the other illustrated diagrams, are not intended to limit the implementation of the described examples. Rather, the diagrams illustrate functional information one skilled in the art could use to design, program, and generate software, or use a combination of hardware and software to perform the illustrated processing.

With reference to FIG. 5, the method 500 can be initiated in response to an instruction to arrange browser windows that are open on a display screen. It can be presumed that a plurality of windows are opened at any one time on the display screen, which include browser windows and non-browser windows. Upon initiation, the method 500 determines a window type for each open window (block 505). As previously described, this can be performed by obtaining window properties and/or attributes of the window. Based on the window type, browser windows can be identified (block 510). The identified browser windows are then re-displayed in a display arrangement according to the instruction to arrange in an available display area of the display screen while ignoring non-browser windows (block 515).

For example, the browser windows are re-sized, re-positioned, and displayed on top of other windows based to a selected arrangement (e.g. tile or cascade). Thus, the instruction to arrange can include a tile instruction and the re-displaying would include tiling the selected browser windows in the available display area. If the instruction to arrange is a cascade instruction, then the re-displaying would include cascading the selected browser windows in the available display area. To re-display the identified browser windows to be on top of the non-browser windows, a z-order value of the identified browser windows are changed appropriately.

The method 500 would, prior to the re-displaying, adjust window dimensions of the identified browser windows. In this operation, the window dimensions would be based on the display arrangement and the available display area.

In another embodiment of method 500, the method can provide arrangement based on window state. For example, the method 500 can determine a state of each of the browser windows and re-display the browser windows according to the state. For example, it may be helpful to know which windows have a error condition/state. Thus, the arrangement can be configured to identify error states and re-display windows with errors in view.

Figure 6:
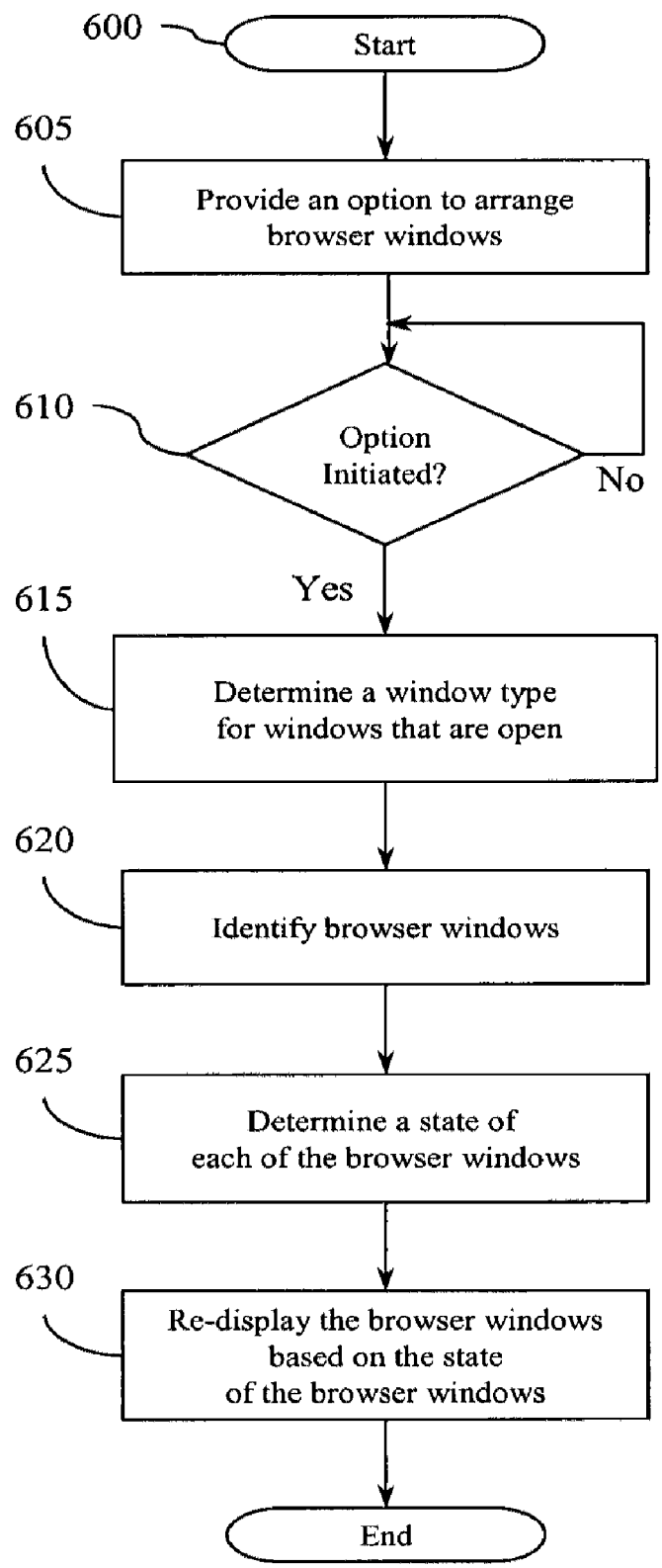
FIG. 6 illustrates an example method associated with arranging browser windows based on state.

With reference to FIG. 6, one embodiment of a method 600 is shown that relates to arranging open windows that are browser windows and further based on a window state. Of course, the method can be implemented with other window types or states. The method will be described in the context of processing a plurality of windows that are open as part of a graphical user interface of a computing device.

The method 600 can begin by providing an option to arrange browser windows that are open (block 605). The option 205 can be a selectable object displayed on a display screen. For example, the method displays the option as a menu item, an icon, or other selectable object on the display screen. The method then does not proceed until the option is selected (block 610).

In response to the option being initiated, the method then determines a window type for each of the plurality of windows that are currently open by the computing device (block 615). In this example, browser windows are the default window type that is set and that is the window type that the method is looking for. Thus, browser windows are identified from the plurality of windows based on the window type and non-browser windows are ignored (block 620). Then a state of each of the browser windows is determined (block 625). Based on the state of the browser windows, the browser windows are re-displayed on the display screen (block 625).

As one example, the state can be set as an error state and browser windows having the error state are re-displayed on top of other windows. The re-displaying can also include filtering the browser windows based on the state and re-displaying only browser windows that have the selected state. Thus, browser windows that do not have an error state would not be re-displayed. The windows can also be ordered such that browser windows with errors are displayed on top followed by non-error browser windows. The re-display can include re-arranging the selected windows in a tile or cascade arrangement as previously described. The same ordering and filtering that can be applied to browser windows can also be applied to browser tabs within a browser tabset.

In one embodiment the browser extension is configured with window session management and state reporting features. For example, the browser extension can collect state information and allow browser windows to broadcast their state. Example states include error, ready to submit, saved, and processing. With this information, the browser window management system can organize web browser windows based on the state information provided by the Window Session Management System. Of course with other computer systems and/or operating systems, state information may reside in different locations. The extension can be configured to obtain the window state information from the appropriate location.

With reference again to FIG. 1, in another embodiment, the window management system 100 can provide a feature that allows a user to hide or show the browser chrome of opened browser windows. By hiding or removing the chrome from the display, the area available for viewing web content can be increased. For example, the browser chrome can include a title bar, address bar, toolbar, status bar, window frames, menus, scroll bars, and other accessories around the borders of a window. The system can perform this feature in response to a user selected option and can be implemented through a single user action.

Window Preview

Figure 7:
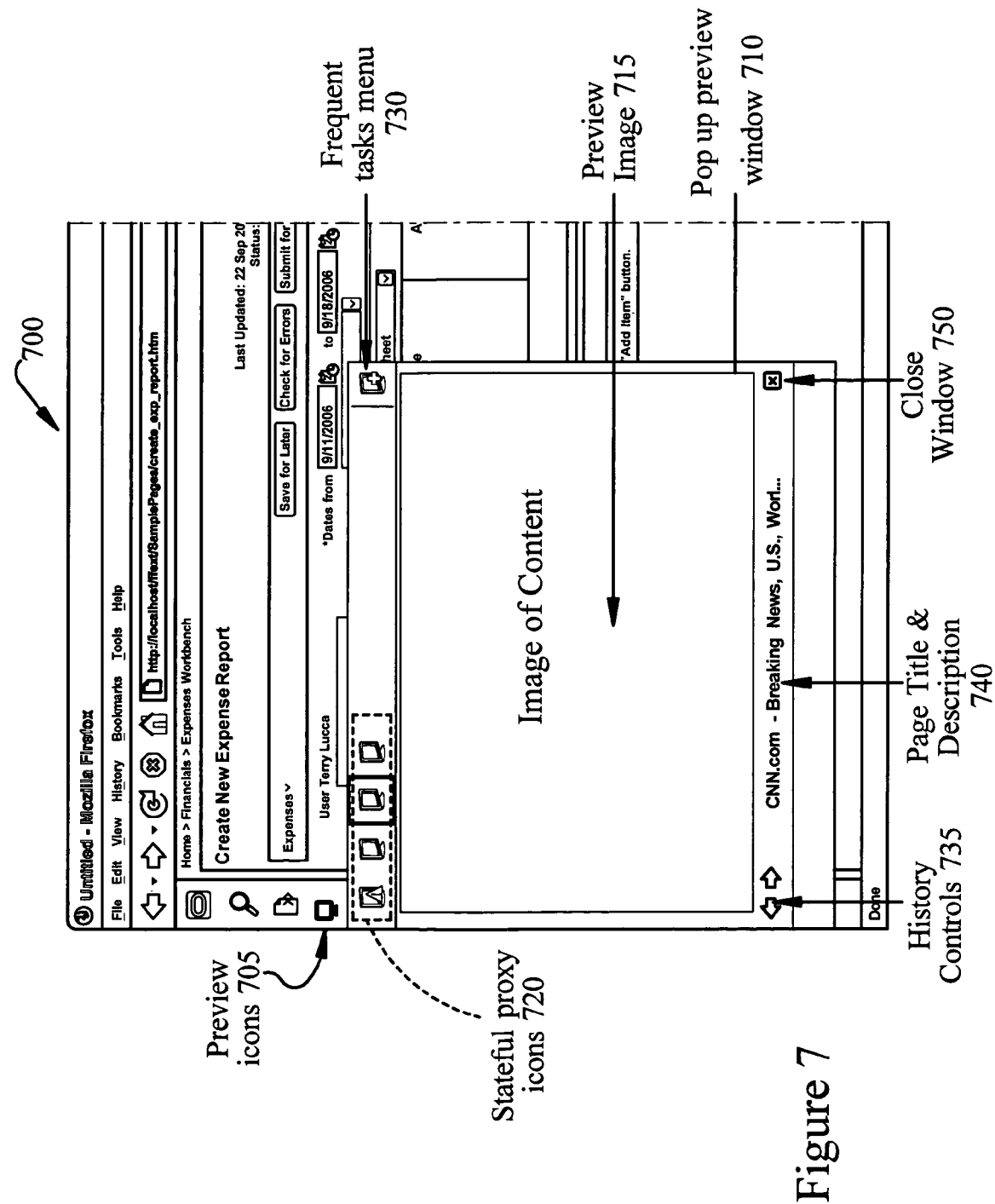
FIG. 7 illustrates an example display of with a window preview feature.

With reference to FIG. 7, one embodiment of a graphical display 700 is shown that includes a window preview option/feature (e.g. a preview icon 705) generated by the window preview logic 130 (from FIG. 1). Users often work with multiple web browsers open at once and lack the tools to know the content and/or state of content in other browser windows that are not currently within their view (e.g. browser windows that are covered or otherwise obstructed from view by other displayed windows). The window preview logic 130 provides users with enhanced insight into the content and/or the state of content within other browser windows that may not be within the user's view.

In one embodiment, the window preview logic 130 is configured to provide functions that allow an end-user to preview other web browser windows and tabs within tabsets hosted by those windows via a popup window. The functions can be implemented and made accessible from within a browser chrome within an active browser window by selecting the displayed preview icon 705. As a result, users do not have to visit other browser windows to see or get a sense for the content and/or state of the content within them. In this manner, the content and/or state of the content within other browser windows, which are typically inactive windows, can be seen without changing the active window.

As is understood, an "active window" is a window in which a user is currently working or directing input. An active window is typically at the top of the Z-order and is distinguished by the color of its title bar. An "inactive window" is a window in which a user's input is not currently being directed. An inactive window is typically distinguished by the color of its title bar, may be partially or entirely obscured from view by other windows, and/or may by minimized.

Figure 8:
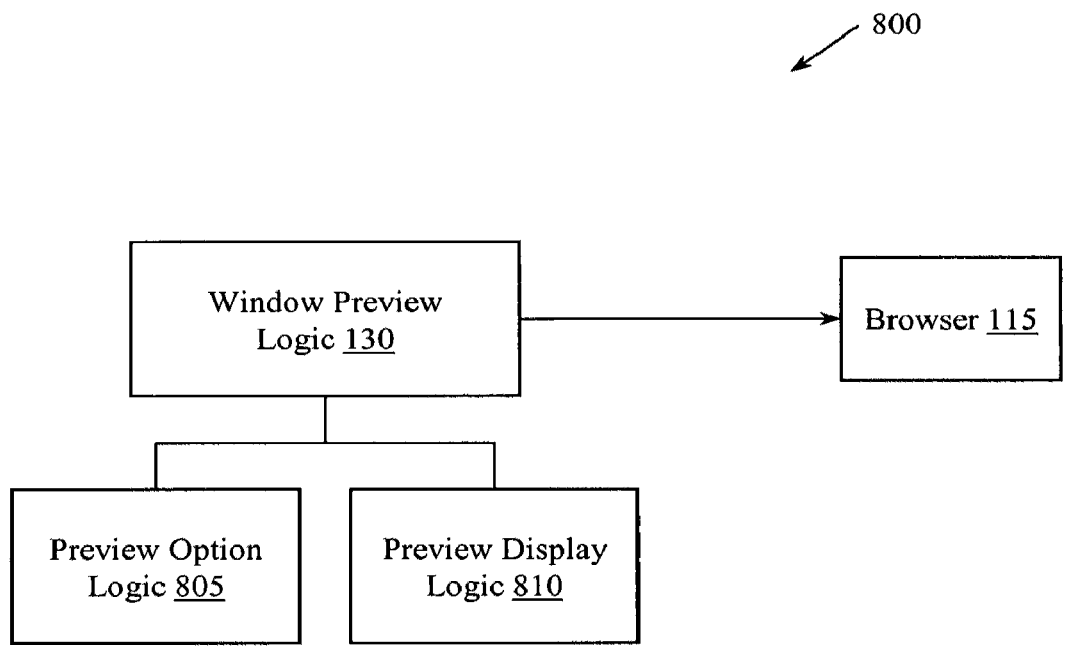
FIG. 8 illustrates an example embodiment of a window preview logic.

With reference to FIG. 8, one embodiment of the window preview logic 130 is shown, which includes a preview option logic 805 and a preview display logic 810. The logic can be implemented as processor executable instructions embodied on a computer-readable medium or can be embodied as part of a web browser application, like browser 115 as previously described with reference to FIG. 1. For example, the processor executable instructions can be embodied as a browser extension.

The preview option logic 805 is configured to provide a preview option on a display screen. The preview option can be, for example, a selectable icon, tab, or menu option. The example of FIG. 7 shows the preview option as preview icon 705. The preview option logic 805 is configured to associate the preview option with an open browser window. If multiple windows are open, the logic 805 can be configured to determine open browser windows from a set of open windows, and provide a preview option for each of the open browser windows.

The preview display logic 810 is configured to generate an image of contents from the open browser window and display the image within a pop-up window in response to the preview option being selected. This function provides a preview of the contents of the open browser window, which may be obscured from view. With the preview popup image, the contents of an unseen browser window can be viewed without making the browser window active or requiring the user to visit the browser window. In other words, the contents can be viewed without changing a display state of the open browser window.

Returning to the example in FIG. 7, in one embodiment, the preview icon 705 can be displayed in a toolbar and made as a selectable object. The preview icon 705 is configured to be associated with or assigned to function with one of the currently open windows. When the preview icon 705 is selected, it triggers the opening of the pop-up preview window 710 that displays a preview image 715 of content from the associated window. In this manner, a user can quickly view the content of an inactive window that may be out of view without activating the inactive window.

In another embodiment, the window preview logic 130 can provide and display within the preview window 710 its own toolbar with one or more stateful proxy icons 720. The proxy icons 720 are proxies for the other open windows or tabs within windows that may be out of view of the user at the current time. By moving a mouse cursor or other pointing device over a proxy icon 720, a preview image (or snapshot) of the content in the associated browser window or tab is generated and displayed to the user. Of course, other ways to activate the icons can be implemented like using the keyboard to tab through the icons.

A rollover/tab action against an icon can also be configured to reveal and display one or more objects. For example, the objects can include a title of the web page and a brief description of the page content if the page provides it (e.g. title and description 740), tools for navigating the history of pages viewed in that browser window/tab combination (e.g. history controls 735), and/or an action to close that browser window or tab without having to visit the window first (e.g. a close window button 745).

The proxy icon, which can be the target of the rollover/tab action as described above, is implemented to communicate the page state when the web page provides state information. For example, an icon in an error state can display a warning image to the user, thus giving notice that this window requires attention. For an asynchronous process window, an indeterminate progress animation can be displayed to indicate to the user that it is busy and cannot be interacted with. Thus, the preview feature provides a single point of access as a way to access many other windows. By rolling over a preview icon 705 or a proxy icon 720 of a window, stateful information about the window can be automatically retrieved.

In one embodiment, web pages can provide state information via meta tags delivered in their page headers. Thus, web pages can be designed to participate and operate with the present preview feature by having appropriate meta tags created. In this way, any web page can participate in the enhanced window state communication.

In another example, the preview logic can be configured to allow users to summon (e.g. activate/visit) a window or tab that they are previewing by clicking on either the proxy icon 720 or the preview image 715 of the displayed preview window 710. Another option can be provided that allows users to access frequently executed tasks via a menu item positioned off the preview window 710. This feature can be accessed by an icon in the toolbar (e.g. frequent tasks menu 730). The frequent tasks menu 730 represents actions that are performed frequently from the page being previewed. For example, actions performed by the user can be recorded by the system and immediate access to the actions is provided via this menu option. One example of a frequent task can be when a user frequently runs expense reports. This task can be added to the menu of frequent tasks available from this page and provide a way for the user to launch a new window to execute the task. The task list can be derived from reading and interpreting meta tags posted to the page header.

The following is another example operation of the web page preview mechanism. When a user clicks the preview icon 705, the preview mechanism is triggered and the preview window 710 is drawn/popped-up adjacent to the icon that was clicked. The preview window can include a toolbar across the top of the window. Beneath it, a thumbnail can be displayed that represents the window that is out of view. Controls can also be provided to manipulate that window from the preview without having to visit the window.

In one embodiment, the window preview logic 130 can use Windows Mediator to look at all open browser windows, determine window types, discard windows of no importance based on the type (e.g. Javascript windows, BVP source windows, alert windows), and just bring back a set of open windows that contain content. Then for each window that has appropriate metatags attached to them (which allows the window to participate in this convention), the metatags are read and interpreted. From the metatags, status properties of a window can be determined. An icon is associated to each window and is displayed. In one example, the icon (or other type of preview option) can be displayed based on the status that is determined so that a representation of the status properties can be seen. An example status would be an error condition pre-save state where a user has not yet saved information they are working with. Of course, there are many types of status and even customized status types can be created for particular situations. The status can then be added to the metatags of a webpage.

In another embodiment, the preview logic and its interface can be configured to respond to the presence of a pointer. For example as the pointer rolls over a preview icon on the display screen, Windows Mediator is used to obtain information of the browser windows and create a thumbnail preview of the content within the browser window. In other words, the system obtains a hook (e.g. a pointer) to the browser window that is out of the user's view, creates a snapshot of the image, and creates a thumbnail. In one embodiment, rather than presenting the entire window as the thumbnail, which owing to image scaling would be small and hard to distinguish between other like windows, the preview feature takes the upper left quadrant of the window and only displays this portion. The assumption is that the upper left quadrant is where the distinguishing information of a window tends to reside. Of course, other portions can be displayed as well.

Figure 9:
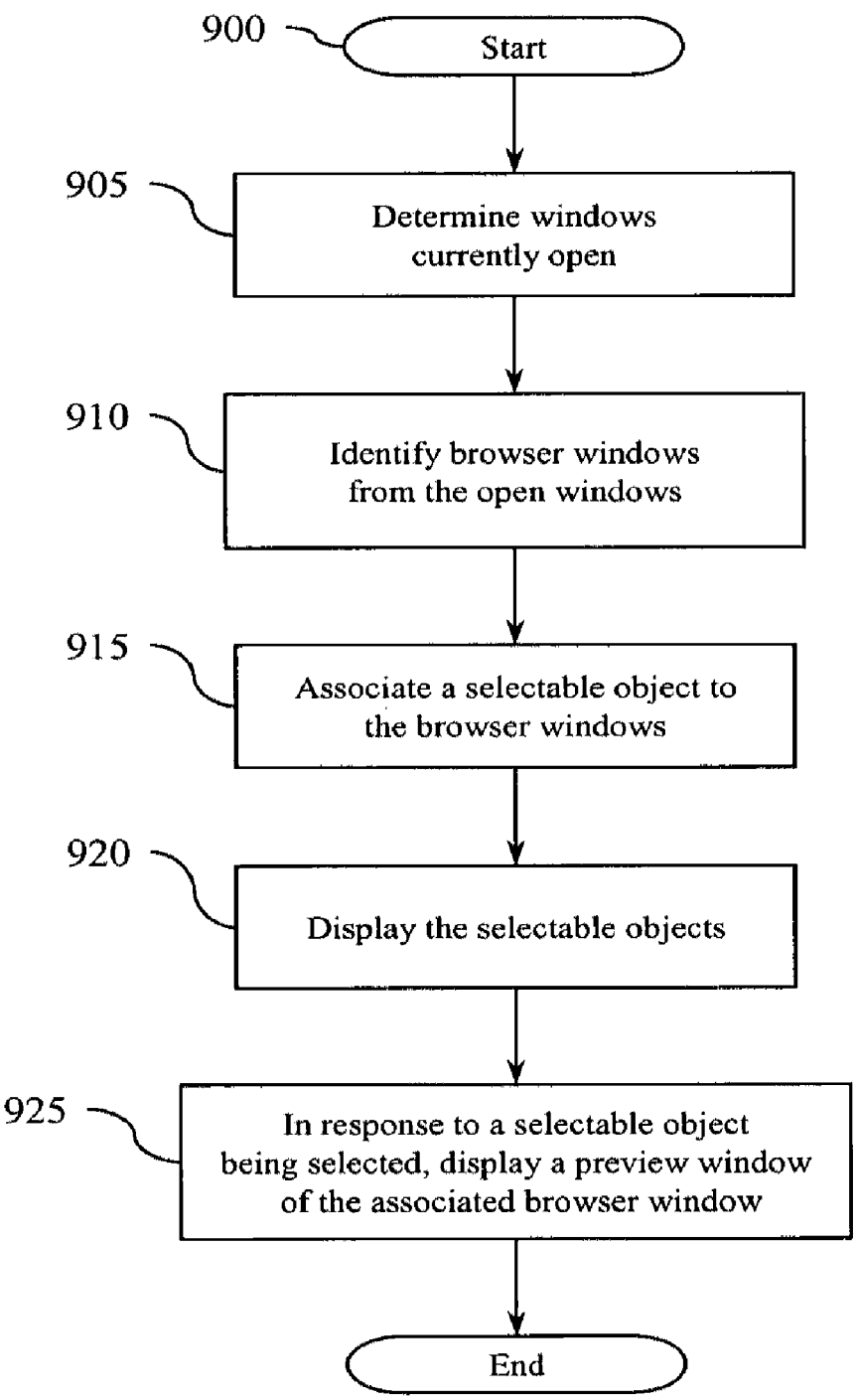
FIG. 9 illustrates an example method that can be associated with a window preview.

With reference to FIG. 9, one example of a method 900 is shown that can be implemented for the preview logic as described above. The method 900 can be used to process windows as part of a graphical user interface of a computing device having a display screen and provide the preview functions. For example, the method can determine windows that are currently open (block 905) and identify browser windows from the windows that are open (block 910). Identifying information can be obtained for example from window header information, metatags, or the like. A selectable object can then be associated to each of the browser windows (block 915). For example, the object is the preview icon 705 shown FIG. 7 or the like.

The method 900 can then display, on the display screen, each of the selectable objects associated to the browser windows (block 920). In response to one of the selectable objects being selected, the method can display a preview window showing contents of the browser window associated with the selected object. Optionally in other embodiments, the method 900 can perform actions/functions like those described with reference to the window preview logic 130 and its components.

Logged-in Status

While operating with web sites within a web browser, users may be required to provide a username and password in order to access and work with the underlying systems. Once logged in, users do not have a simple way to determine all of the systems they are currently logged into. This lack of insight forces users to close all browser windows to ensure they are logged off all systems or else visit all systems web pages and manually log off each system. This is an inconvenience to users. If they fail to do so and leave their browser open and unattended, they expose their user accounts to misuse by others.

The logged-in status logic 140 (shown in FIG. 1) provides a logged-In status feature that can determine and manage a list of domains that the user is logged into. In one embodiment, the feature can be embodied as software and can be delivered to a user as a part of the Enterprise Web Browser Extension or in a separate browser extension.

Figure 10:
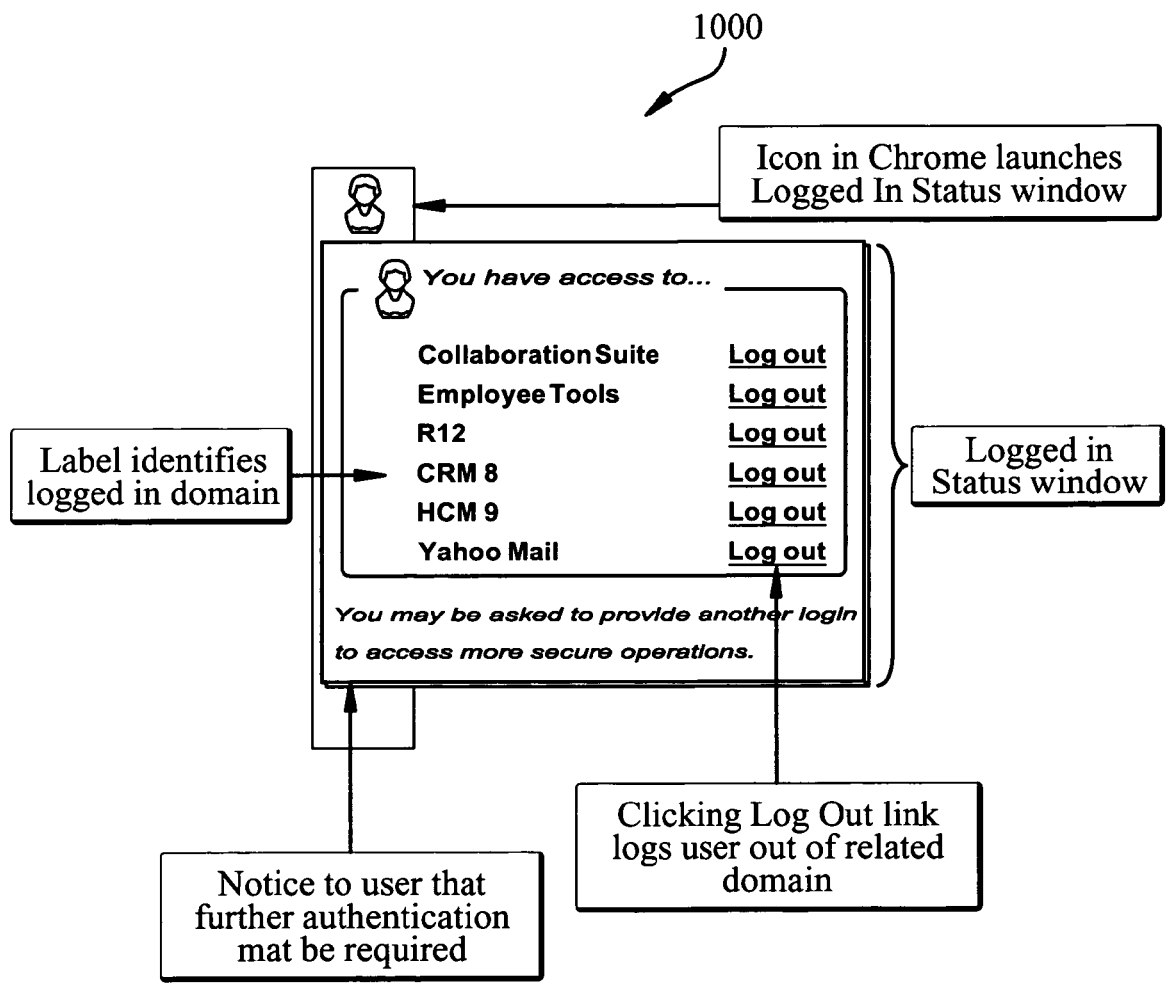
FIG. 10 illustrates an example display of with a logged-in status feature.

In one example, the logged-in status logic 140 can determine and display all of the domains that the user is currently logged-in to, based on authentications that have been successfully initiated within a current web browser session. With reference to FIG. 10, one example of a displayed logged-in status window 1000 is illustrated. For cookie-based authentication schemes, the logic enables the user to log out of a logged-in session without having to visit the underlying application to do so.

In one embodiment, as a user logs-in to different web systems and/or domains during a browser session, the system returns credentials (e.g. session cookies). The logged-in status logic 140 is configured to capture the domain of the session and store the information on the client-side. In this manner, a list of systems that are logged-into is created and stored. Upon a request from the user to view the logged-in list, the information from the stored list is retrieved and displayed to the user. The status window 1000 with a logged-in list is shown in FIG. 10 is one example.

The system can be configured to track various amounts of information related to each of the logged-in systems. For example, a minimum amount of data can be stored to reduce security issues. Data that can be tracked after a log-in can include a document title and cookie session ID. A pointer to the cookie can also be stored.

In another embodiment, an option can be provided with the displayed logged-in list that allows the user to log-out of a selected system. For example, next to each identifier shown for each logged-in system, a selectable "log out" option or link can be provided. In this manner, the system provides a convenient way to view all logged-in systems and selectively log out from one location.

Figure 11:
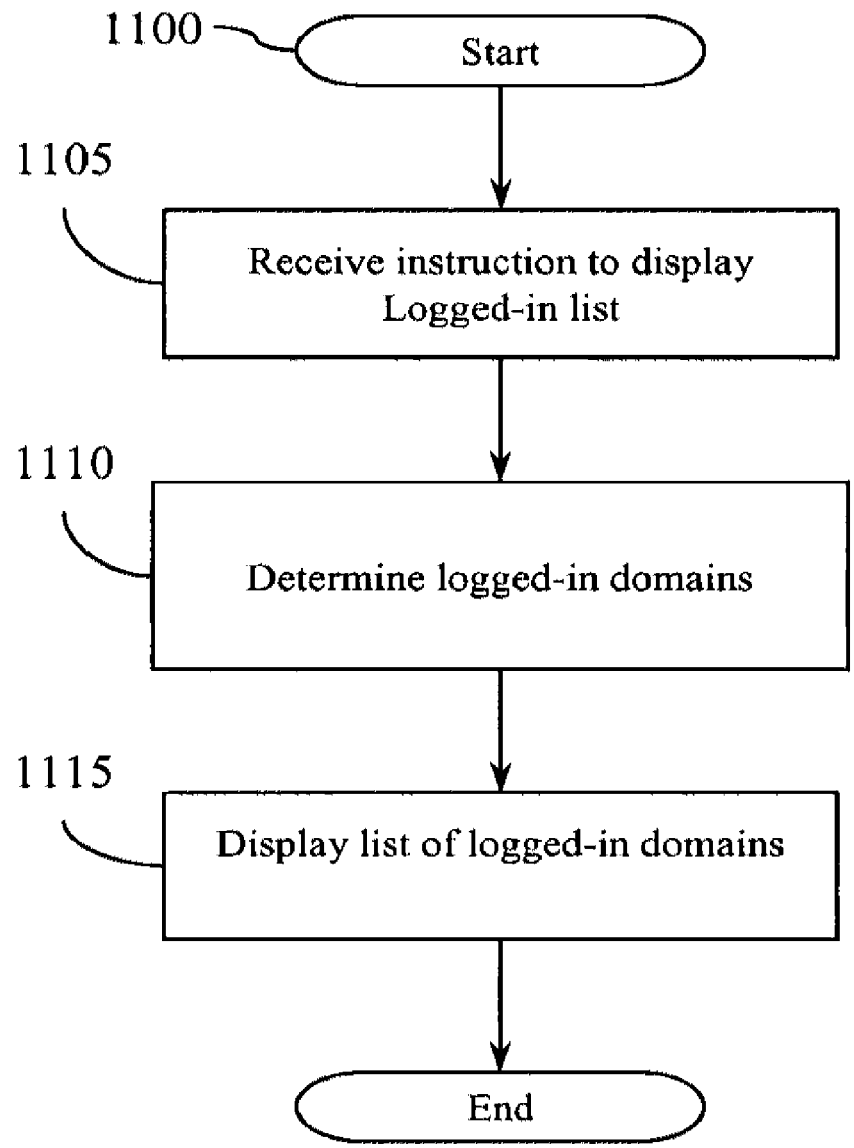
FIG. 11 illustrates an example method associated with the logged-in status feature.

With reference to FIG. 11, an example method 1100 is shown for providing a logged-in status. The method can be initiated, for example, by receiving an instruction from the user via an icon (e.g. a Logged In Status icon in browser chrome) to display the logged-in list (block 1105). The system determines the logged-in domains of the user by reading and retrieving previously stored logged-in data from a stored location (block 1110). A window/pop-up flyout (such as window 1000) is opened and the list of logged-in domains is displayed to the user (block 1115).

Optionally, a log-out link can be provided with each listed domain to allow a means for logging-out of the domain from the status window. If a log-out link is clicked or otherwise selected, the system begins a process to purge authentication information related to the corresponding domain. Optionally, the system can ask the user to confirm that he/she wants to logout of the domain. If user confirms the action, a log out request is sent to the domain, and the related domain is removed from the logged-in status flyout window 1000. Thus, the logged-in status logic 140 provides users with enhanced insight into the systems they are currently logged into and simple way to disconnect from those systems.

Firefox® Example

As previously described, one embodiment of the present window management system is to implement the system as a browser extension. The extension can be configured to add the features described herein to a Mozilla Firefox® browser (a web browser supported by the Mozilla Foundation) or other browser to give it additional functionality. The extension can add productivity tools, which are viewed as augmentations, so the tools and a user's browser can work with selected web sites, web services, or selected third party applications to improve customer productivity.

The extension mechanism implemented for the Mozilla Firefox® browser includes XUL. Of course, other types of mechanisms can be used to implement and/or install the present features into other types of browsers based on their applicable technologies. This will be readily understood by those of ordinary skill in the art. Of course, the features can be programmed directly into a browser application.

"XUL" (XML User-interface Language) is a cross-platform language for describing user interfaces of applications. XUL (pronounced zool) was created to make development of the Mozilla browser easier and faster. XUL is an XML language (Extensible Markup Language) so all features available to XML are also available to XUL. There are several ways that XUL applications are created. In the Firefox browser, an extension adds functionality to the browser itself, often in the form of extra toolbars, context menus, or user interface (UI) to customize the browser UI. This is accomplished by using a feature of XUL called an overlay, which allows the UI provided from one source, in this case the Firefox browser, to be merged together with the UI from the extension. Extensions may also be applied to other Mozilla based products such as Thunderbird.

In one example, the extensions are small packages of XUL files, Javascript, style sheets and/or images packed together into a single file. The file can be created by using a ZIP utility. When the user downloads an extension from a network location, it will be installed onto the user's machine. The extension will hook into the browser using a XUL specific feature called an overlay, which allows the XUL from the extension and the XUL in the browser to combine together. To the user, it may seem like the extension has modified the browser, but in reality, the code is separate, and the extension may be uninstalled easily. Of course, the present features can also be implemented as a software plug-in or other type of software update code.

Figure 12:
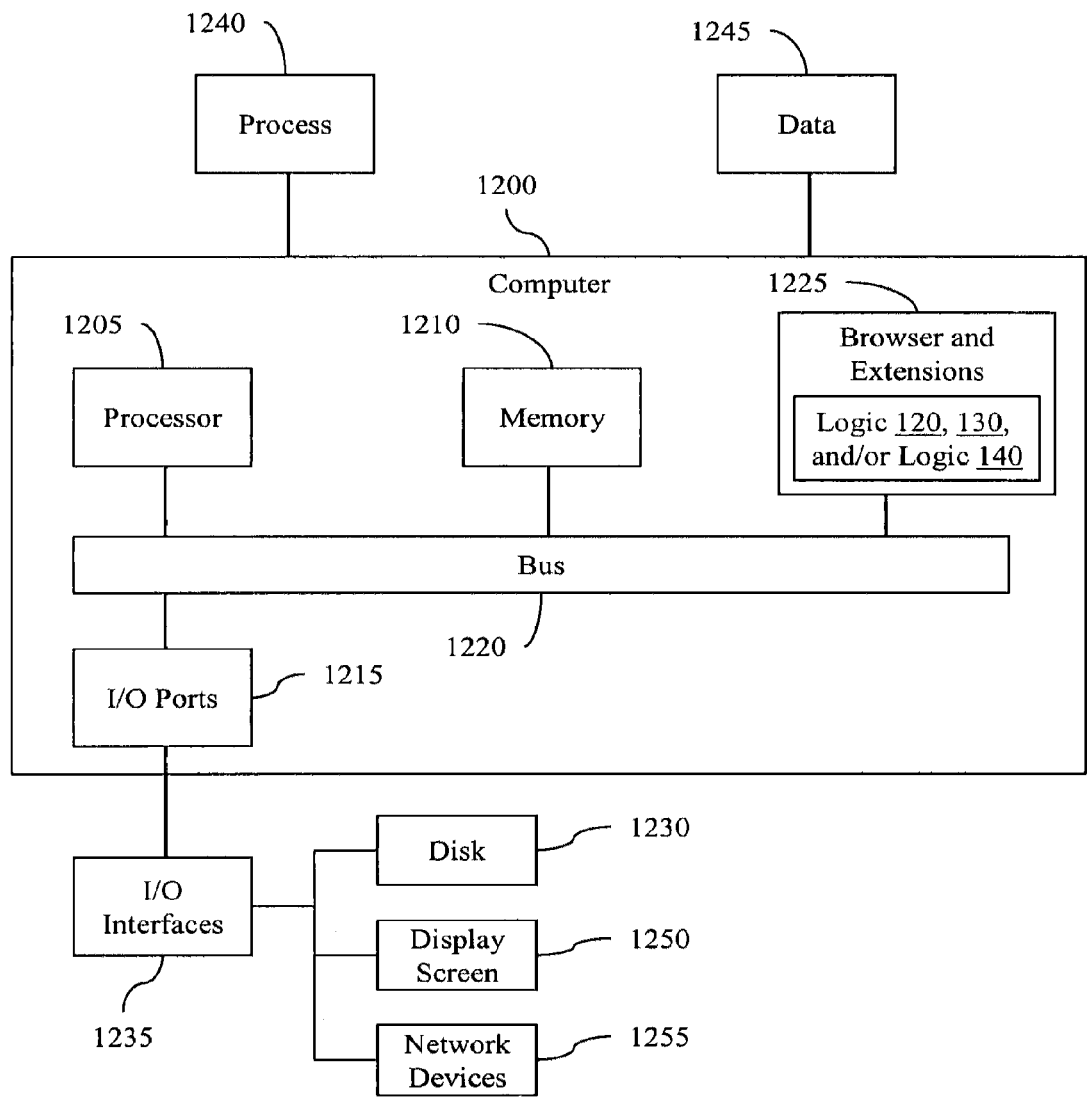
FIG. 12 illustrates an example computing environment in which example systems and methods illustrated herein can operate.

FIG. 12 illustrates an example computing device in which example systems and methods described herein, and equivalents, can operate. The example computing device may be a computer 1200 that includes a processor 1205, a memory 1210, and input/output ports 1215 operably connected by a bus 1220. In one example, the computer 1200 may include a web browser application 1225 (with extensions if present) configured to facilitate an enterprise-ready web browser with one or more of the window management features described herein such as the window arrangement logic 120, window preview logic 130, and/or logged-in status logic 140 (shown in FIG. 1 and described throughout). The browser 1225 can be implemented similar to the browser and extensions described in the previous figures, and/or the other systems and methods described herein. The computing device 105 shown in FIG. 1 can be implemented as computer 1200.

Generally describing an example configuration of the computer 1200, the processor 1205 can be a variety of various processors including dual microprocessor and other multi-processor architectures. The memory 1210 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 1230 may be operably connected to the computer 1200 via, for example, an input/output interface (e.g., card, device) 1235 and the input/output port 1215, or can be an internal component. The disk 1230 can include, but is not limited to, devices like a magnetic disk drive, a solid state disk drive, a floppy disk drive, a tape drive, a Zip drive, a flash memory card, and/or a memory stick. Furthermore, the disk 1230 can include optical drives like a CD-ROM, a CD recordable drive (CD-R drive), a CD rewriteable drive (CD-RW drive), and/or a digital video ROM drive (DVD ROM). The memory 1210 can store processes 1240 and/or data 1245, for example. The disk 1230 and/or memory 1210 can store an operating system that controls and allocates resources of the computer 1200.

The bus 1220 can be a single internal bus interconnect architecture and/or other bus or mesh architectures. While a single bus is illustrated, it is to be appreciated that computer 1200 may communicate with various devices, logics, and peripherals using other busses that are not illustrated (e.g., PCIE, SATA, Infiniband, 1394, USB, Ethernet). The bus 1220 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 1200 may interact with input/output devices via i/o interfaces 1235 and input/output ports 1215. Input/output devices can include, but are not limited to, a keyboard, a microphone, a pointing and selection device, cameras, video cards, the disk 1230, a display screen 1250, network devices 1255, and the like. The input/output ports 1215 can include but are not limited to, serial ports, parallel ports, and USB ports.

The computer 1200 can operate in a network environment and thus may be connected to the network devices 1255 via the I/O interfaces 1235, and/or the I/O ports 1215. Through the network devices 1255, the computer 1200 may interact with a network. Through the network, the computer 1200 may be logically connected to remote computers. The networks with which the computer 1200 may interact include, but are not limited to, a local area network (LAN), a wide area network (WAN), and other networks. The network devices 1255 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 1255 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium having processor executable instructions that when executed, cause a computing device to perform a method, the method comprising:

providing a list of window types based on a plurality of different windows and current processing states of the plurality of different windows;

in response to an instruction to arrange windows of a window type that are open on a display screen, where the instruction is initiated by a user selection of the window type from a popup menu that displays the list of window types that are open on the display screen:

determining a window type for the windows that are open including determining a current processing state of the windows by determining whether a window is in an error state, a ready to submit state, a saved state, or a processing state;

identifying the windows based on the window type; and automatically re-displaying the windows of the window type that is selected in a display arrangement based on the instruction to arrange the windows of the window type while ignoring windows that are not of the window type, wherein the re-displaying includes selectively modifying the display arrangement to display a window in an error state on top of other windows.

2. The non-transitory computer-readable medium of claim 1 further including processor executable instructions where the instruction to arrange includes a tile instruction and the re-displaying includes tiling the selected windows in an available display area, where the available display area is a whole viewable area of the display screen.

3. The non-transitory computer-readable medium of claim 1 further including processor executable instructions where the instruction to arrange includes a cascade instruction and the re-displaying includes cascading the selected windows in an available display area of the display screen.

4. The non-transitory computer-readable medium of claim 1 further including processor executable instructions that change a z-order of the identified windows causing the identified windows to be re-displayed on top of windows that are not the window type.

5. The non-transitory computer-readable medium of claim 1 further including processor executable instructions that adjust window dimensions of the identified windows prior to the re-displaying, the window dimensions being based on the display arrangement and an available display area.

6. The non-transitory computer-readable medium of claim 1 comprising stored instructions being embodied as part of a browser extension stored on a non-transitory computer-readable medium configured to be installed in the web browser.

7. The non-transitory computer-readable medium of claim 1 further including processor executable instructions for:

determining if a sidebar is displayed and if displayed, adjusting a position of the sidebar to a side position of the display screen; and prior to re-displaying the windows in an available display area of the display screen, modifying the available display area to exclude an area of the sidebar.

8. A method for processing a plurality of windows that are open as part of a graphical user interface of a computing device, the method comprising:

providing an option to arrange browser windows that are open by displaying a popup menu with a list of window types of the plurality of windows that are open including a browser window type, wherein the list of window types includes selections for current processing states of the plurality of windows;

in response to the option being initiated, determining a window type for each of the plurality of windows that are open, wherein the option being initiated includes a selection of a current processing state from the list of window types;

identifying browser windows from the plurality of windows based on the window type while ignoring non-browser windows;

determining a current processing state of each of the browser windows determining whether a browser window is in an error state, a ready to submit state, a saved state, or a processing state; and re-displaying, on the display screen, browser windows having the selected current processing state, and wherein browser windows in the error state are re-displayed on top of windows of the selected current processing state.

9. The method of claim 8 where the method is performed as part of an executing web browser or as part of a browser extension to the web browser.

10. The method of claim 8 further including, in response to an instruction to display a logged-in list of domains:

retrieving previously stored logged-in data from a stored location that identifies domains in which a user is currently logged-in; and displaying a window containing a list of logged-in domains based on the retrieved logged-in data.

11. A system, comprising:

a graphical user interface that includes a window arrangement option for display on a display screen and being configured to provide a popup menu with a list of window types of currently open windows from which a window type is selected and to automatically initiate, when selected, an arrangement of open windows having the selected window type where the list of window types includes selections for current processing states of the open windows; and a non-transitory computer-readable medium that stores an arrangement logic configured to re-display, in response to the window arrangement option being selected, the open windows having the selected window type in a selected arrangement on the display screen without re-displaying the open windows not having the selected window type, wherein the arrangement logic is further configured to determine a current processing state of each the currently open windows, wherein the current processing state is one of, an error state, a ready to submit state, a saved state and a processing state, and wherein the arrangement logic is configured to re-display the open windows having the selected window type by modifying the selected arrangement to display a window in the error state before the open windows having the selected window type.

12. The system of claim 11, where the selected arrangement is selected from a tile arrangement and a cascade arrangement; and the graphical user interface including:

tiling logic configured to adjust a size and position of open windows having the selected window type based, at least in part, on an available display area to fit the available display area in a tile arrangement where the available display area is a whole viewable area of the display screen; and cascading logic configured to adjust a size and position of open windows having the selected window type based, at least in part, on the available display area to fit the available display area in a cascade arrangement.

13. The system of claim 11 where the arrangement logic is configured to re-display the open windows having the selected window type on top of other windows, and where the arrangement logic is configured to populate the list of window types from the window types of open windows and the current processing states of the open windows.

14. The system of claim 11, where the arrangement logic is configured to determine a window type of open windows by obtaining an attribute of the open windows through a hook in an operating system associated with the graphical user interface; and to populate the list of window types based, at least in part, on the window types of open windows.

15. The system of claim 11, being embodied as part of a web browser application or as a browser extension configured to be installed as part of the web browser application.

16. The system of claim 11, wherein the graphical user interface is implemented as processor executable instructions stored on a non-transitory computer-readable medium.

17. The system of claim 11, wherein the arrangement logic is further configured to re-display the open windows with the selected window type from a most recently accessed window to a least recently accessed window.

* * * * *

UNITED STATES PATENT AND TRADEMARK OFFICE
CERTIFICATE OF CORRECTION

| | | |
|---|---|---|
| PATENT NO. | : 8,245,151 B2 | |
| APPLICATION NO. | : 11/978907 | |
| DATED | : August 14, 2012 | |
| INVENTOR(S) | : Selig | |

It is certified that error appears in the above-identified patent and that said Letters Patent is hereby corrected as shown below:

On Title page, in column 2, under "Other Publications", line 1, delete "www.en.wikipedia.com;" and insert -- www.en.wikipedia.org; --, therefor.

Title page 2, in column 2, under "Other Publications", line 10, after "Office" insert -- Non-Final Office --.

On sheet 10 of 12, in figure 10, line 16, delete "mat" and insert -- may --, therefor.

In column 3, line 9, delete ""logic"," and insert -- "Logic", --, therefor.

In column 3, line 56, delete "servelet," and insert -- servlet, --, therefor.

In column 10, line 2, delete "by" and insert -- be --, therefor.

In column 17, line 8, in Claim 8, after "windows" insert -- by --.

Signed and Sealed this
Sixth Day of November, 2012

David J. Kappos
*Director of the United States Patent and Trademark Office*